United States Patent [19]

Gravert

[11] 4,106,541
[45] Aug. 15, 1978

[54] QUICK ACTING COUPLING

[75] Inventor: William H. Gravert, Port Washington, N.Y.

[73] Assignee: Marine Moisture Control Company, Inc., Inwood, N.Y.

[21] Appl. No.: 762,739

[22] Filed: Jan. 26, 1977

[51] Int. Cl.² ............................................. F16L 23/02
[52] U.S. Cl. ............................................. 151/48; 285/84; 151/24; 403/316; 248/507
[58] Field of Search ............ 151/9, 10, 13, 47, 48, 151/50, 63, 64, 8, 24; 248/507, 508; 285/39, 84, 85, 86, 308, 317, 358, 394; 403/316, 317, 318, 336, 338; 81/177 B

[56] References Cited

U.S. PATENT DOCUMENTS

| 1,576,698 | 3/1926 | Williams | 285/85 |
|---|---|---|---|
| 2,372,888 | 4/1945 | Duggan | 151/24 |
| 2,996,318 | 8/1961 | Gravert | 285/358 |
| 3,165,341 | 1/1965 | Burns et al. | 403/338 |
| 3,464,474 | 9/1969 | Jansen | 151/24 |

FOREIGN PATENT DOCUMENTS

| 564,203 | 11/1932 | Fed. Rep. of Germany | 285/358 |
|---|---|---|---|
| 801,018 | 12/1950 | Fed. Rep. of Germany | 151/48 |
| 204,180 | 9/1923 | United Kingdom | 151/6 |
| 479,894 | 11/1975 | U.S.S.R. | 403/338 |

Primary Examiner—Marion Parsons, Jr.
Attorney, Agent, or Firm—J. Harold Nissen

[57] ABSTRACT

A quick acting coupling for coupling together heavy cargo pipes which includes releasable locking means to permit rotation of a cam element in one direction and prevent rotation in an opposite direction, and upon release of this locking means to permit rotation in the opposite direction.

12 Claims, 5 Drawing Figures

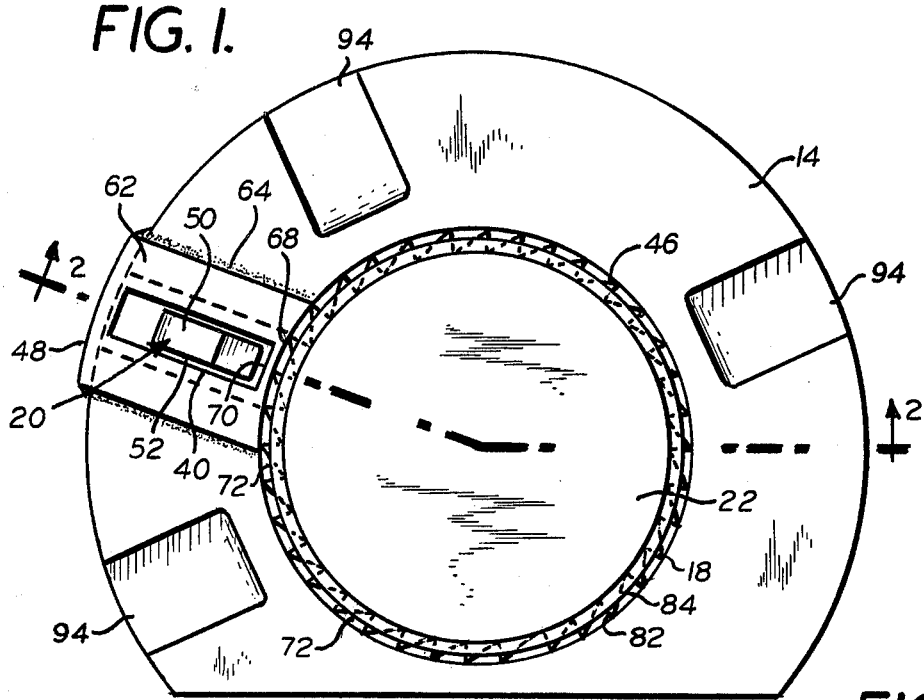
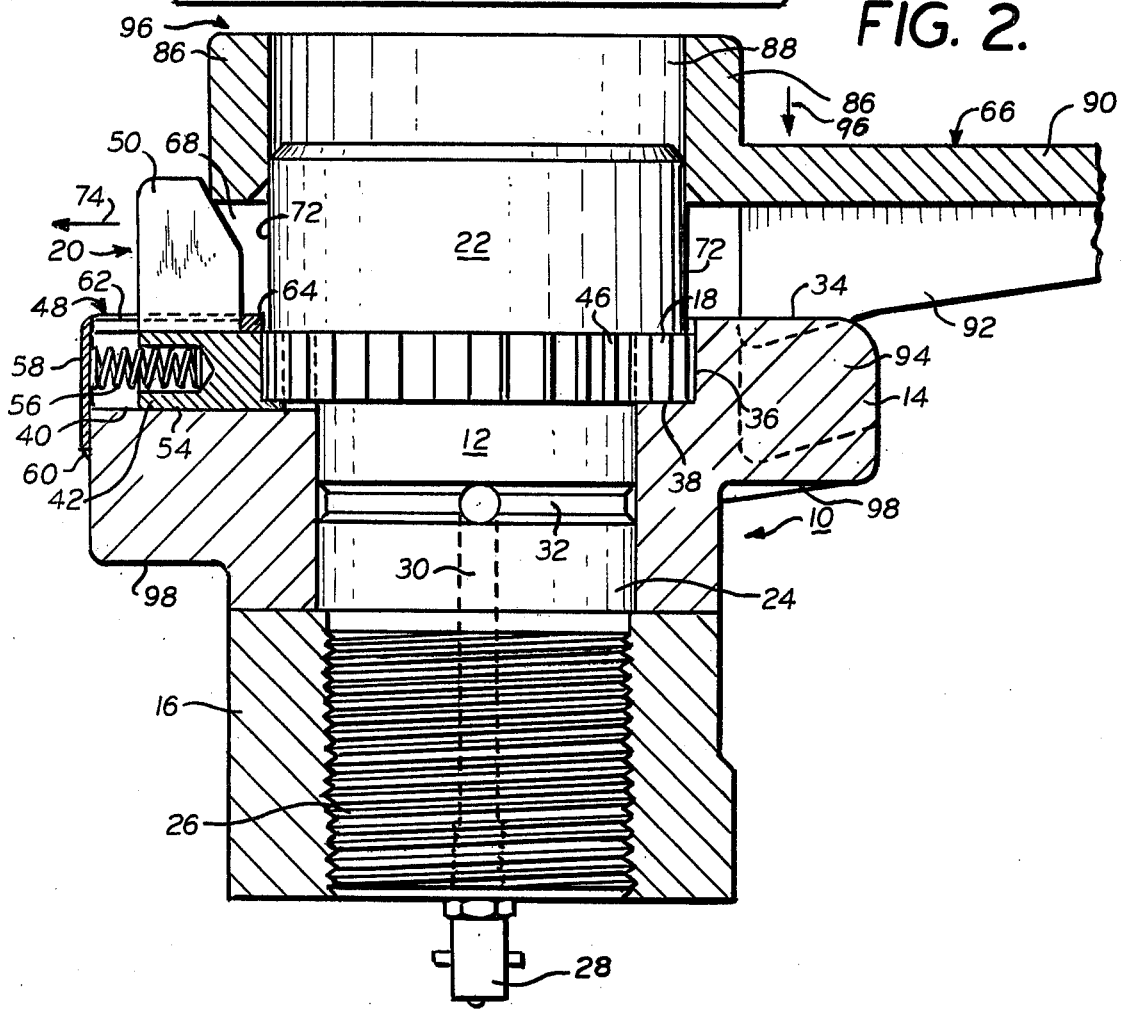

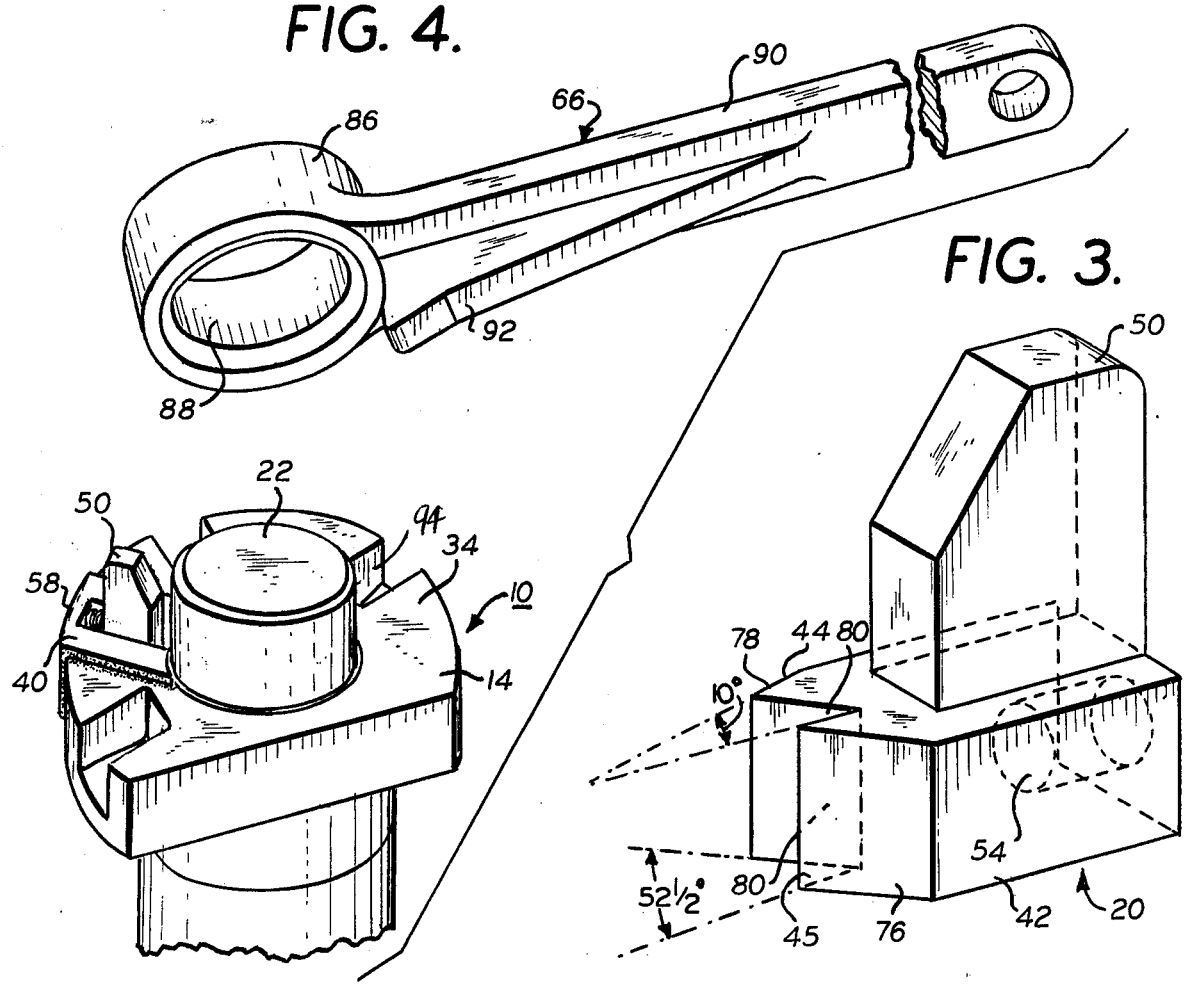
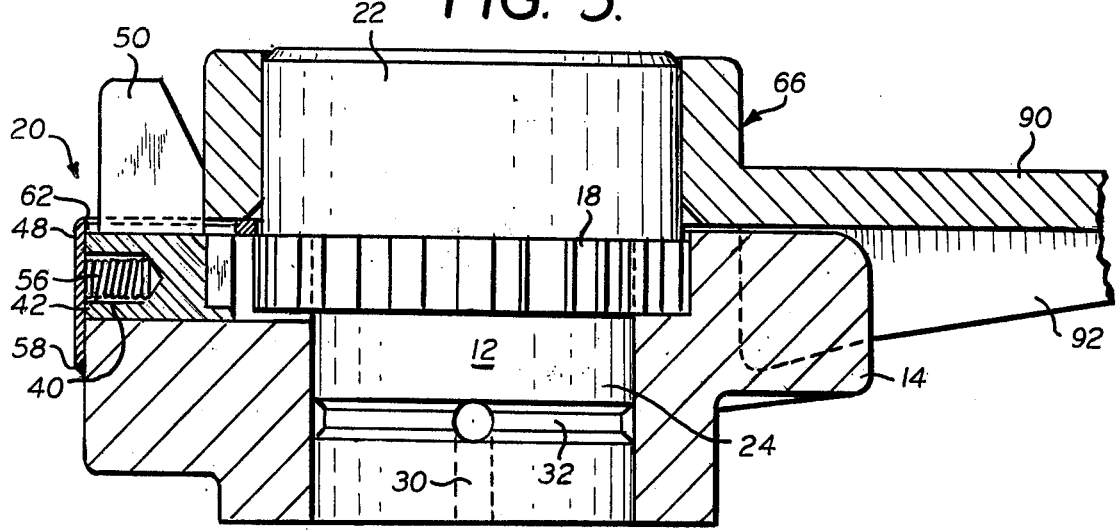

QUICK ACTING COUPLING

BACKGROUND OF THE INVENTION

1. Field of the Invention

This invention relates to pipe couplings, and more particularly, to a new and improved fail-safe coupling which includes means for rapidly and efficiently coupling together and decoupling from each other hoses, pipes and tubes.

2. Description of the Prior Art

Pipe couplings have been known to the prior art for a considerable period of time. An adequate description of the prior art in this particular field is set forth in applicant's earlier U.S. Pat. No. 2,996,318 over which this invention is an improvement. The desirability of coupling and decoupling two members such as pipes which have to be connected and disconnected speedily and without great effort is well-known. Moreover, it is necessary that a safe coupling be provided to insure positive connection and locking while affording ease of unlocking and disconnection.

SUMMARY OF THE INVENTION

In order to provide for an improved coupling, the present invention provides for a fail-safe coupling which includes positive locking engagement elements. Specifically, the present invention proposes the provision of ratchet member fixed to a bolt which is held in a clamp support and a cooperating slide locking element provided with teeth adapted to engage the teeth of the ratchet. The teeth of the slide locking element when in engagement with the ratchet permits rotation of the cam in its locking direction to lock the surface of the cam with the surface of the flange, but prevents rotation of the cam in a direction opposite to its aforesaid locking direction. Spring means is provided to bias the slide locking element into engagement with the ratchet.

A wrench is provided to overcome the spring bias of the spring and cause the teeth of the slide locking element to become disengaged from the ratchet to permit the rotation of the cam in the opposite direction. The wrench is provided with a lug and the cam is provided with one or more lug receiving recesses to permit the wrench to engage the cam positively in a number of different positions and rotate the cam in either the locking or the unlocking direction. When the lug on the wrench is engaged with one of the recesses in the cam, the teeth of the slide locking element are disengaged from the teeth on the ratchet.

The cooperation between the slide locking element and the ratchet assures a positive locking effect therebetween and a locking of the cam surface with the flange surface with which the cam surface is engaged in their locking mode. Positive locking and unlocking is required. If desired, means can be provided to prevent unauthorized use of a wrench to move the slide locking element and thereby prevent the cam from being rotated in its unlocking direction.

While the invention has been described in connection with the coupling of two pipes together, it will be evident that the coupling in accordance with the invention may also be used to connect a cover plate to close off the entry to a pipe.

It is therefore, an object of this invention to provide a fail-safe coupling with positive connection and ease of disconnection.

Another object of the invention is to provide a spring-loaded locking device to assure positive connections and locking of the cam surface to the surface of the flange.

A further object of the invention is to provide a spring-loaded device which is adapted to cooperate with a wrench to overcome a positive locking element of the locking device and to permit the movement of the cam to separate the contacting surfaces of the flange and the cam.

Other objects, advantages and the nature of the invention will be fully understood and become apparent from the following description of the preferred embodiment of the invention, shown, by way of example, in the accompanying drawings:

BRIEF DESCRIPTION OF THE DRAWINGS

FIG. 1 is a plan view of the quick acting pipe coupling in accordance with the invention;

FIG. 2 is a sectional view taken on line 2—2 of FIG. 1, with a wrench shown in section being placed over the head of the bolt to lock and to unlock the quick acting pipe coupling by movement of the cam;

FIG. 3 is a perspective view of the slide ratchet which forms one of the locking elements;

FIG. 4 is an exploded perspective view of the wrench and the locking cams which are adapted to cooperate with each other; and, FIG. 5 is a sectional view somewhat similar to FIG. 2, but showing the wrench in engagement with the cam to open or to lock the cam against the top surface of the flange.

DESCRIPTION OF THE PREFERRED EMBODIMENT

Referring to the drawings which illustrate a preferred embodiment of the invention, a quick-acting fail-safe coupling 10 is shown which is an improvement over the coupling shown in U.S. Pat. No. 2,996,318. It is to be understood that the coupling of this invention is an improvement over the means to lock bolt 25, for example, to the clamp support 19 shown in the aforesaid patent, and the disclosure thereof is herein incorporated by reference.

Quick-acting fail-safe coupling 10 in accordance with the present invention includes a bolt 12 which cooperates with a cam 14 having a sloped cam locking surface which corresponds with sloped cam surface 33 of the earlier U.S. patent and a clamp support 16. Cam 14 and clamp support 16 are generally equivalent to cam 31 and clamp support 21 of the aforementioned U.S. patent and include the associated elements such as the top surface of the flange 41 which have been omitted for the sake of clarity as they form no part of the present invention.

The improved locking features of the invention include a ratchet 18 which cooperates with a slide locking element 20.

Bolt 12 includes a head portion 22 and a shank portion 24 which is threaded at its lower end 26 to threadedly engage clamp support 16. A suitable grease fitting 28 is attached to the lower end of bolt 12 which has a central bore 30 and a lateral bore 32 to provide suitable lubrication at the surfaces between shank portion 24 and cam 14. Positioned on shank portion 24 below head 22 is ratchet 18 which is peripherally disposed on shank portion 24 and fixed to head 22, such as by welding so as to form a composite unit with bolt 12.

Cam 14 includes a top portion 34 which is peripherally recessed at 36 to form an L-shaped recess. Peripheral ratchet 18 is adapted to sit onto the base 38.

The improved locking features of the invention also include a guideway 40 in cam 14 opening towards the ratchet 18 to guide slide locking element 20 into locking engagement with ratchet 18. For this purpose, slide locking element 20 includes a base portion 42 provided with a pair of ratchet engaging teeth 44 and 45 cut in a manner to fit into and smoothly engage teeth 46 on ratchet 18 and thereby lock bolt 12 and cam 14 to prevent relative rotation therebetween. Base portion 42 is slidable within guideway 40 and is held therein by means of a cover plate 48. Slide locking element 20 includes an outwardly projecting upstanding portion 50 projecting through an elongated guide slot 52 for controlling together with guideway 40 the movement of slide locking element 20 transverse to the axis of bolt 12. Slide locking element 20 is provided with an opening 54 to receive one end of a compression spring 56, the other end of the compression spring being held within guideway 40 by means of one leg 58 of cover plate 48. Leg 58 and one end of compression spring 56 are in abutting relationship. Cover plate 48 is connected with cam 14 and held thereto, such as by welding at 60. The other leg 62 of cover plate 48 overlies the top surface of the base portion 42 including the guideway 40 and is provided with guide slot 52 through which upstanding portion 50 extends external of guideway 40 and within which upstanding portion 50 is movable to move base portion 42 against the force of compression spring 56 to disengage slide teeth 44 from ratchet teeth 46. Top leg 62 is connected at 64 to the top surface of cam 14, such as by welding.

Teeth 44 and 46 are sloped in such a manner, as explained further hereinafter, that only one way movement of cam 14 is possible. Cam 14 is rotatable clockwise to move slide locking element 20 in guideway 40 against the force of compression spring 56, but locking element 20 is not movable against the force compression spring 56 when cam 14 is rotated counterclockwise (as shown in the drawings). What is important is the one way movement of cam 14, so that it will only move slide locking element 20 against the force of compression spring 56 for one of its directions of rotation.

As noted, slide locking element 20 includes a pair of teeth 44 and 45, each having a different tooth configuration in order to provide for the one-way movement of cam 14 with respect to ratchet 18 and bolt 12 when the teeth 44, 45 engage teeth 46 of ratchet 18. In order to permit movement of cam 14 in a counterclockwise direction as referenced to FIG. 1, it is necessary to disengage teeth 44, 45 from teeth 46. For this purpose, a wrench or camming element 66 is provided which is adapted to fit in the space 68 between the face 70 of upstanding portion 50 and the side of head 22 formed by its outer peripheral surface 72 to move slide locking element 20 in the direction of the arrow 74 so as to cause teeth 44, 45 to become disengaged from teeth 46 and thereby permit cam 14 to be rotated in a counterclockwise direction as viewed in the drawing and to enable the surface 98 of cam 14 to be unlocked from the surface of the flange (not shown).

In order to provide for the one-way positive locking action between teeth 44, 45 and teeth 46 and the one-way relative rotation between teeth 44, 45 which rotate with cam 14 and teeth 46 which do not rotate and which are stationary with head 22 of bolt 12, the teeth are provided with a particular angular configuration. In this respect, particular reference is made to FIG. 3 of the drawings in which the slide locking element 20 is shown with two teeth 44 and 45 each having a different configuration. Each of teeth 44 and 45 have a first sloping side 76 and a second side. Sides 76 and teeth 44 and 45 lie in planes parallel to each other. Tooth 44 has a side 78 and tooth 45 has a side 80 which lie in non-parallel planes and are angular spaced from each other; and sides 78 and 80 are angularly spaced from their associated sides 76 by different amounts. Sides 76, which are corresponding sides on each of teeth 44 and 45 lie in parallel planes, whereas sides 78 and 80, which are also corresponding sides, lie in planes which, if extended would intersect each other. The angular spacing between adjacent sides of the adjoining teeth, i.e., side 76 of tooth 44 and side 80 of tooth 45 is approximately $52\frac{1}{2}°$, and the side 80 extends in a plane which is aligned with a diametrical plane of head 22 and and ratchet 18. On the other hand, the planes of corresponding sides 78 and 80 intersect and form an included angle therebetween of about 10°, with side 78 being displaced from the diametrical plane of head 22 by an angle of 10°. The teeth of ratchet 18 are shaped to complement tooth 45 so that side 82 of teeth 46 are in a diametrical plane of head 22 and side 84 lies in a plane at an angle to cooperate with teeth 44 and 45. Side 78 is in a plane displaced from the diametrical plane by 10° in order to prevent teeth 44 and 45 from locking with teeth 46 on the ratchet. Moreover, since tooth 44 is undercut or has an included angle of 10° less than tooth 45, surface 78 is effective to permit surface 82 to cam surface 78 to move the slide locking element against the force of compression spring 56 for compression thereof. As circumferential portion 86 of wrench 66 is moved in opening or space 68 to overcome the force of compression spring 56 to move base portion 42 against the leg 58 of the cover plate, the cam 14 is permitted to rotate counterclockwise, as viewed in the drawings, to provide for unlocking of the locking surface 98 of cam 14 from the locking surface of the flange (not shown). When it is desired to open or to separate the surface 98 of cam 14 from the locking surface of the flange (not shown), it is necessary to physically move the teeth of the locking element 20 out of engagement with ratchet 18.

In order to asssist in the opening or unlocking cam surface 98 from the surface of the flange, wrench 66 is provided. Wrench 66 includes circumferential portion 86 having an opening 88, a handle 90 connected with circumferential portion 86 and a depending lug or spline member 92.

Cam 14 is provided with at least one and preferably three recessed or undercut portions 94 which are adapted to receive the lug member 92 when the opening 88 of circumferential portion 86 of wrench 66 is placed around the outer peripheral surface 72 of head 22. The circumferential portion 86 of wrench 66 is adapted to fit in space 68 when the teeth of locking element 20 fully engage the teeth of ratchet 18. Movement of the wrench 66 vertically in a direction of arrow 96 is effective to move locking element 20 in the direction of arrow 74 to overcome the force of compression spring 56 and to disengage or release teeth 44 and 45 from engagement with teeth 46 and to permit cam 14 to be rotated in the counterclockwise direction.

In order to assist in the unlocking of cam 14 from the flange surface, lug 92 of wrench 66 may be engaged within one of the recesses 94 so as to provide for the necessary torque. In order to provide for a positive tight locking engagement between the flange surface and surface 98 of cam 14, wrench 66 may also be used in a similar manner with lug 92 brought into engagement with recesses 94 to lock cam 14 to the flange surface by rotation of the cam 14 in a clockwise direction as viewed in the drawings. While the cam 14, as noted heretofore, may be rotated in a clockwise direction without disengaging teeth 44 and 45 from teeth 46, wrench 66 is also useful to provide the necessary torque to obtain a tight locking engagement between the cam 14 and the flange surface (not shown).

While wrench 66 is indicated as being useful to separate teeth 44 and 45 from teeth 46 and to unlock cam 14 from the flange, it should be noted that all that is necessary is for a lever element having the thickness of circumferential portion 86 be inserted into space 68 and moved from its position shown in FIG. 2 to its position shown in FIG. 5 so as to move slide locking element 20 in the direction of arrow 74. After teeth 44 and 45 are disengaged from teeth 46, any suitable type of wrench with one or more projecting lugs which are adapted to fit within recesses 94 may be used to rotate cam 14.

While there has been shown what is considered to be a preferred embodiment of the invention, it will be obvious to those skilled in the art that various changes and modifications may be made therein without departing from the scope of the invention.

What is claimed is:

1. A quick acting coupling for coupling together a pair of heavy pipes or hoses, comprising:
    a clamp support;
    a bolt threadedly received within and coupled to said clamp support, said bolt including a shank portion;
    a rotable cam element rotatable about said bolt and held to said clamp support as a unit; and,
    releasable locking means to lock said cam element to said bolt to permit rotation in one direction and prevent rotation in an opposite direction;
    said releasable locking means including a ratchet carried by said bolt, and a spring urged locking element supported in said cam element, a compression spring urging said locking element into engagement with said ratchet, said locking element including first and second dissimilar configurated teeth, one of said teeth having an included angle less than the other of said teeth, one of said first and second teeth being complementary with the teeth of said ratchet, whereby to enable said cam element to be rotated in one direction but prevented from rotation in a direction opposite to said one direction.

2. A coupling according to claim 1, including a wrench engageable with said cam element and said locking element, said wrench moving said locking element against the force of said compression spring to disengage said teeth from said ratchet.

3. A coupling according to claim 2 wherein said cam has at least two recessed portions, and said wrench includes at least one lug adapted for engagement with one of said recessed portions when said teeth are disengaged from said ratchet for rotating said cam.

4. A coupling according to claim 1, wherein said teeth have one pair of corresponding sides which lie in planes parallel to each other and another pair of corresponding sides which lie in non-parallel planes, said different spacing of said other pair of corresponding sides permitting rotation of said ratchet in a direction opposite to said one direction when said teeth and ratchet are engaged.

5. A coupling according to claim 5, wherein said adjacent sides between said teeth form an angle of approximately 52½° therebetween, and said planes of said corresponding sides lying in said non-parallel planes forming an angle of about 10° therebetween.

6. A coupling according to claim 1, wherein said releasable locking means includes a guideway in said cam element opening towards said ratchet, a slide including an upstanding portion and a base portion in said guideway guided for movement towards and away from said ratchet, said compression spring being in said guideway and having one end operatively associated with said slide for urging movement thereof in said guideway towards said ratchet, a cover plate covering said guideway including first and second legs, said first leg abutting the other end of said compression spring, said second leg overlying said guideway and having a guide slot, said upstanding portion being coupled to said slide and extending external of said guideway through said guide slot to provide an external means to disengage said teeth from said ratchet.

7. A coupling according to claim 1, wherein one of said first and second teeth is complimentary with the teeth of said ratchet, the other of said first and second teeth preventing rotation of said ratchet in said other direction while permitting rotation in said one direction.

8. A coupling according to claim 7, wherein said cam includes a guideway and a cover for said guideway, said compression spring and said locking element being in said guideway and being guided for movement therein.

9. In a quick acting coupling for coupling together a pair of heavy pipes or hoses, having a clamp support, a bolt threadedly received within and coupled to the clamp support, the bolt having a shank portion, a rotable cam element rotatable about the bolt and held to the clamp support as a unit, and locking means to lock the cam element to the bolt; the improvement comprising releasable locking means to lock said cam element to said bolt to permit rotation in one direction and prevent rotation in an opposite direction to counteract external rotating forces;
    said releasable locking means including:
    a ratchet carried by said bolt;
    a guideway in said cam element opening towards said ratchet,
    a slide including an upstanding portion and a base portion in said guideway guided for movement towards and away from said ratchet.
    a compression spring urging said base portion into engagement with said ratchet,
    a cover plate covering said guideway including first and second legs, and
    said first leg abutting the other end of said compression spring, said second leg overlying said guideway and having a guide slot, said upstanding portion being coupled to said slide and extending externally of said guideway through said guide slot to provide an external means to disengage said base portion from said ratchet.

10. In the coupling of claim 9, wherein said releasable locking means includes a spring urged locking element operatively associated with said base portion supported in said cam element, said locking element including first and second teeth, one of said teeth having an included angle less than the other of said teeth, whereby when said teeth are in engagement with said ratchet to enable said cam element to be rotated in one direction but prevented from rotation in a direction opposite to said one direction.

11. In the coupling of claim 10, wherein one of said first and second teeth is complementary with the teeth of said ratchet, the other of said first and second teeth preventing rotation of said ratchet in said other direction while permitting rotation in said one direction.

12. In the coupling of claim 11, including a wrench engageable with said cam element and said releasable locking means, said wrench being adapted for movement of said spring urged locking element to disengage said first and second teeth from said ratchet to unlock said releasable locking means to permit rotation of said cam element in said opposite direction.

* * * * *

UNITED STATES PATENT AND TRADEMARK OFFICE
CERTIFICATE OF CORRECTION

PATENT NO. : 4,106,541
DATED : August 15, 1978
INVENTOR(S) : William H. Gravert

It is certified that error appears in the above-identified patent and that said Letters Patent are hereby corrected as shown below:

Column 2, line 27, "cams" should be "cam";

line 49, there should not be a period after the word patent.

Column 3, line 40, "the force compression" should be "the force of compression".

Column 4, line 16, "i.e.," should be "i.e.";

line 19, "head 22 and and ratchet 18, should be "head 22 and ratchet 18".

Column 6, line 46, "said bolt;" should be "said bolt,"

line 50, "ratchet." should be "ratchet,"

NOTE: Column 7 of Patent is double spaced.

Signed and Sealed this

Twentieth Day of March 1979

[SEAL]

Attest:

RUTH C. MASON
Attesting Officer

DONALD W. BANNER
Commissioner of Patents and Trademarks